United States Patent [19]

King et al.

[11] Patent Number: 4,675,168

[45] Date of Patent: Jun. 23, 1987

[54] ANTIMONY THIOANTIMONATE AND INTERMEDIATE PREPARATION FOR LUBRICANT ADDITIVE

[75] Inventor: James P. King, Upper Gwynedd, Pa.; Charles B. Lindahl, Tulsa, Ok.

[73] Assignee: Pennwalt Corporation, Philadelphia, Pa.

[21] Appl. No.: 725,838

[22] Filed: Apr. 22, 1985

[51] Int. Cl.$^4$ .................. C01B 17/00; C01B 17/18
[52] U.S. Cl. .................. 423/561 R; 423/562; 252/25; 252/28; 252/46.4
[58] Field of Search .................. 423/561 R, 617, 562; 252/25, 28, 46.4

[56] References Cited

U.S. PATENT DOCUMENTS 3,965,016  6/1976  Soulen .................. 252/25
4,336,148  6/1982  Wirth et al. .................. 252/28 X

*Primary Examiner*—Ferris H. Lander

[57] ABSTRACT

Method of preparing alkali metal or ammonium thioantimonate and use of the thioantimonate in the preparation of $SbSbS_4$, having a low level of free sulfur, and lubricants incorporating the $SbSbS_4$ as an additive.

27 Claims, No Drawings

ANTIMONY THIOANTIMONATE AND INTERMEDIATE PREPARATION FOR LUBRICANT ADDITIVE

BACKGROUND OF THE INVENTION

Antimony thioantimonate (SbSbS$_4$) has been prepared by reaction of antimony oxide (dissolved in conc. potassium hydroxide solution) with sodium thioantimonate (Na$_3$SbS$_4$) in an aqueous medium followed by neutralization of the resulting solution with an acid. See, for example, J. P. King and Yayesh Asmerom, "Investigation of Extreme-Pressure and Antiwear Properties of Antimony Thioantimonate", ASLE Transaction, Vol. 24, 4, 497–504 (1981); and U.S. Pat. No. 3,965,016, to Soulen (issued June 22, 1976). The overall reaction can be written as follows:

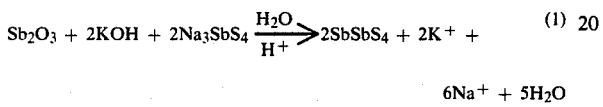

$$Sb_2O_3 + 2KOH + 2Na_3SbS_4 \xrightarrow[H^+]{H_2O} 2SbSbS_4 + 2K^+ + 6Na^+ + 5H_2O \quad (1)$$

There are severe limitations associated with the above reaction, i.e., (1) co-precipitation of free sulfur (6%) with the final product and (2) generation of hydrogen sulfide during neutralization. Subsequent studies have shown that a side reaction simultaneously occurs during the neutralization step, as follows:

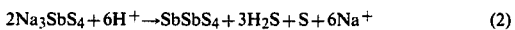

$$2Na_3SbS_4 + 6H^+ \rightarrow SbSbS_4 + 3H_2S + S + 6Na^+ \quad (2)$$

Excessive amounts (more than about 1%) of free sulfur in lubricant additives (such as SbSbS$_4$ and others) are highly undesirable because the free sulfur promotes corrosion of copper-containing metal parts. Because of the added costs in removing free sulfur from the final product and collecting H$_2$S, an improved and economic manufacturing process for preparing SbSbS$_4$ is highly desirable.

This invention involves a modified reaction route with straight-forward processing conditions to prepare SbSbS$_4$ having a low sulfur content. The new process can produce SbSbS$_4$ containing free sulfur at the more acceptable level of about 1% or less. Furthermore, generation of H$_2$S during neutralization is virtually eliminated. In addition, the new process does not require isolation and purification of the intermediate, Na$_3$SbS$_4$.8H$_2$O. A distinct advantage of the modified reaction route is the fact that the second reaction (Equation 4) is simple and easily controlled.

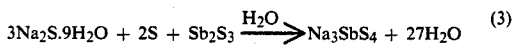

$$3Na_2S.9H_2O + 2S + Sb_2S_3 \xrightarrow{H_2O} Na_3SbS_4 + 27H_2O \quad (3)$$

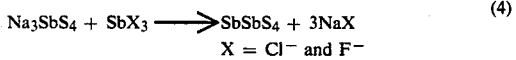

$$Na_3SbS_4 + SbX_3 \longrightarrow SbSbS_4 + 3NaX \quad (4)$$
$$X = Cl^- \text{ and } F^-$$

By carefully controlling the reaction temperatures and pH of the reaction medium good yields of SbSbS$_4$ containing less than 1% free sulfur can be achieved. The examples listed in Tables I, II and III clearly demonstrate the importance and criticality of the reaction conditions in relation to free sulfur generation and the yields of SbSbS$_4$. The following descriptions for preparing Na$_3$SbS$_4$ solutions and SbSbS$_4$ from SbF$_3$ and SbCl$_3$ are the preferred procedures.

BRIEF SUMMARY OF THE INVENTION

The method of the invention for preparing the thioantimonate intermediate is defined as the method of preparing alkali metal or ammonium thioantimonate without the formation of substantial by-products, comprising:

(a) forming an aqueous reaction mixture of
  (i) sulfur,
  (ii) a sulfide or hydrosulfide of an alkali metal or ammonium ion, or mixtures of said sulfides or hydrosulfides, and
  (iii) a 1% to 10% molar excess of Sb$_2$S$_3$; and
(b) maintaining the reaction mixture of (a) at a temperature within the range of from about 70° C. to about 105° C. for a sufficient period of time to provide the alkali metal or ammonium thioantimonate without the formation of substantial by-products.

Preferably in (a) the molar excess of Sb$_2$S$_3$ is within the range of 1.5 to 5%.

The method of the invention for preparing low sulfur SbSbS$_4$ is defined as adding ammonium thioantimonate to a solution of SbX$_3$, wherein X is a halide ion, to form a reaction medium while maintaining controlled reaction conditions, to provide a SbSbS$_4$ prduct having a low level of free sulfur impurity.

Preferably, the alkali metal or ammonium thioantimonate is added to the solution of SbX$_3$ at a sufficiently slow rate to maintain substantially all the SbSbS$_4$ product in a solid phase. It is also preferred that the SbX$_3$ solution include as a solvent water or an alcohol of one to four carbon atoms or a mixture thereof, X be Cl$^-$, and the intermediate be Na$_3$SbS$_4$. Preferably, the reaction medium is agitated during the addition of alkali metal or ammonium thioantimonate, the method is a batch method, the reaction temperature is maintained during the addition of alkali metal or ammonium thioantimonate within the range of 0° to 30° C., and the pH of the reaction medium is maintained at substantially all times during the addition of alkali metal or ammonium thioantimonate at a level of 7 or less (preferably by controlling the rate of addition of the alkali metal or ammonium thioantimonate to the SbX$_3$ solution).

The invention also includes lubricant compositions incorporating the SbSbS$_4$ of the invention as a lubricant additive.

DETAILED DESCRIPTION OF THE INVENTION

Examples 1–6

Preparation of Sodium Thioantimonate Solutions:

In a typical reaction of the invention for preparing Na$_2$SbS$_4$ (or the potassium or ammonium salts) solution (Equation 3 above), a two-liter round bottom flask fitted with a heating mantle, an electric motor driven stirrer, a water-cooled condenser, a thermometer and a nitrogen inlet and outlet tubes was used. The flask was first charged with 400 ml. of distilled water followed by Sb$_2$S$_3$ and sulfur with good agitation. The reaction mixture was heated to 80° C. for three to four hours. The resulting black slurry was then filtered and the black residue, NaSb(OH)$_6$, was washed with small amounts of distilled water and the washings combined with the filtrate. The filtrate containing Na$_3$SbS$_4$ varied in color from light yellow to dark green. At times the filtrate appeared black or lime colored. By using a slight excess (2%) of $Sb_2S_3$, significant reduction of the by-product (black residue) was achieved. Experimental results are recorded in Table I below.

heating the repulped mixture to 75° C. to 84° C. The red cake was then dried to constant weight in a 100° C. oven. Experimental data are recorded in Table II be-

TABLE I

Preparation of $Na_3SbS_4$ Solution from $Na_2S \cdot 9H_2O$, $Sb_2S_3$, and S

| Example No. | Dist. $H_2O$ ml | Charge $Na_2S \cdot 9H_2O$ grams | $Sb_2S_3$ grams | S grams | Temp. of Reaction °C. | Time of Reaction hrs | Vol. of Filtrate $Na_3SbS_4$ sol'n, ml | Weight of Insoluble Residue grams | Remarks |
|---|---|---|---|---|---|---|---|---|---|
| 1 | 400 | 174.3 | 82.1 | 15.2 | 98–101 | 3.0 | 600 | 22.1 | stoichiometric |
| 2 | 400 | 174.3 | 82.1 | 15.2 | 75–85 | 3.5 | 627 | 19.7 | stoichiometric |
| 3 | 400 | 197.0 | 82.1 | 17.5 | 80–82 | 3.5 | 670 | 14.0 | 15% excess $Na_2S \cdot 9H_2O$ and S |
| 4 | 400 | 174.3 | 90.4 | 15.2 | 79–84 | 3.5 | 640 | 14.9 | 10% excess $Sb_2S_3$ |
| 5 | 400 | 174.3 | 83.8 | 15.2 | 79–85 | 3.5 | 637 | 3.7 | 2% excess $Sb_2S_3$ |
| 6 | 400 | 174.3 | 83.8 | 15.2 | 81–84 | 3.5 | 620 | 1.4 | 2% excess $Sb_2S_3$ | low.

TABLE II

Preparation of $SbSbS_4$ from $Na_3SbS_4$ and $SbF_3$

| Example No. | $SbF_3$ Charged grams | Solvent | Vol ml | Temp. °C. | $Na_3SbS_4$ Solution Added Vol.[1] ml | % of[2] Theory | Temp. of Reaction °C. | pH at end point of $Na_3SbS_4$ add'n | Reflux Time hr | pH after Reflux | $SbSbS_4$ Recovery grams | % Yield Based on $SbF_3$ | % Yield Based on $Sb_2S_3$ | % $S^o$ Content |
|---|---|---|---|---|---|---|---|---|---|---|---|---|---|---|
| 7 | 17.9 | $H_2O$ | 25 | 23 | 185 | 119 | 4 to 8 | 8 | none | — | 39.9 | 107 | 88 | 7.4 |
| 8 | 17.9 | $H_2O$ | 25 | 24 | 190[5] | 124 | −2 to 3 | 7 | 2 | 7 | 37.8 | 102 | 82 | 3.4 |
| 9 | 17.9 | EtOH | 25 | 26–7 | 190 | 130 | −2 to 4 | 7 | 2 | 7 | 37.3[3] | 100 | 77 | 1.1 |
| 10 | 17.9 | EtOH | 25 | 0 | 160 | 113 | 2 to 6 | 7 | 2 | 7 | 37.1[4] | 100 | 86 | 0.8 |
| 11 | 17.9 | EtOH | 25 | 0 | 165 | 116 | −1.4 to 8 | 7 | 2 | 6–7 | 37.1 | 100 | 84 | 1.8 |
| 12 | 17.9 | EtOH | 35 | 0 | 125 | 93 | −1 to 4 | 6 | 2 | 6 | 34.3 | 92 | 105 | 1.1 |
| 13 | 17.9 | EtOH | 35 | 0 | 115 | 86 | −1 to 6 | 6 | 2 | 6 | 31.3 | 84 | 95 | 0.95 |
| 14 | 17.9 | EtOH | 35 | 0 | 105 | 78 | −2 to 1 | 6 | 2 | 5–6 | 28.8 | 77 | 95 | 0.90 |
| 15 | 17.9 | EtOH | 35 | 0 | 130 | 97 | −2 to 5 | 6 | 2 | 6 | 35.6 | 96 | 95 | 1.2 |
| 16 | 17.9 | EtOH | 35 | 0 | 105 | 93 | 2 to 6 | 6–7 | 2 | 6 | 28.9 | 93 | 96 | 1.2 |
| 17 | 17.9 | EtOH | 35 | 0 | 110 | 84 | −1 to 4 | 7 | 2 | 6 | 31.8 | 85 | 98 | 0.9 |
| 18 | 17.9 | EtOH | 35 | 0 | 110 | 81 | −4 to 6 | 7 | Stir 2 hr at r.t. | 6 | 27.1 | 73 | 60 | 1.7 |

[1]This is the amount of $Na_3SbS_4$ solution required to produce the desired pH.
[2]It is assumed that the yield of $Na_3SbS_4$ in the first reaction is 100%. Since the second reaction is monitored by the pH reading, the values in this column have no significant meaning but were used as a rough guide while carrying out the second reaction.
[3]Total sulfur found in the product = 31.2% (theory, 33.2%). Fluoride ion impurity found: 80 ppm.
[4]Total sulfur found in the product = 33.1% (theory, 33.2%). Fluoride ion impurity found: 110 ppm.
[5]64 ml. added initially which caused pH to go above 7 and produce high free sulfur.

Examples 7–18

Preparation of $SbSbS_4$ from $SbF_3$:

Thirty-five ml. of anhydrous ethanol were added to a 500 ml. round bottom three-necked flask equipped with an electric motor driven stirrer, a water-cooled condenser, a thermometer, an addition funnel and a nitrogen gas inlet and outlet. The alcohol was chilled to about 0° C. with an ice-salt bath under nitrogen atmosphere with stirring. Other solvents such as $H_2O$, $CH_3OH$ or isopropyl alcohol may also be used. Then 17.9 grams (0.1 mole) of $SbF_3$ were added. A cloudy solution resulted. Then, the freshly filtered $Na_3SbS_4$ solution was slowly added (over a 1 to 2 hour period), checking the pH at suitable intervals. Occasionally a pH of 8 was reached which would go to a lower pH after 20 to 30 minutes of stirring. When a stable pH of 6 was observed, the addition of $Na_3SbS_4$ was stopped. This point usually corresponded to less than the theoretical amount of $Na_3SbS_4$. The red slurry was heated to reflux for two hours (the pH was again checked), filtered hot and the red cake washed three times with 300 ml. portions of hot-distilled water, repulping each time and

Examples 20–24

Preparation of $SbSbS_4$ from $SbCl_3$:

Twenty-five ml. of anhydrous ethanol were added to a 500 ml. round bottom three-necked flask equipped with an electric motor driven stirrer, a water-cooled condenser, a thermometer, an addition funnel, and a nitrogen gas inlet and outlet. The alcohol was chilled to around 0° C. with an ice-salt bath under a nitrogen atmosphere, with stirring. Then, 22.8 grams (0.1 mole) of $SbCl_3$ were added. A slightly cloudy solution resulted. Then, the freshly filtered $Na_3SbS_4$ solution was slowly added, checking the pH at suitable intervals. When a stable pH of 6 was observed, the addition of $Na_3SbS_4$ was stopped. The resulting red slurry was heated to reflux for two hours (the pH was again checked), filtered hot and washed three times with 300 ml. portions of hot distilled water, repulping each time and heating the repulped mixture to 75° C. to 85° C. The red cake was dried to constant weight in a 100° C. oven. The results are given in Table III below.

TABLE III

Preparation of SbSbS$_4$ from Na$_3$SbS$_4$ and SbCl$_3$

| Example No. | SbCl$_3$ Charged grams | Solvent | Vol ml | Temp. °C. | Na$_3$SbS$_4$ Solution Added Vol.[1] ml | Na$_3$SbS$_4$ Solution Added % of[2] Theory | Temp. of Reaction °C. | pH at end point of Na$_3$SbS$_4$ add'n | Reflux Time hr | pH after Reflux | SbSbS$_4$ Recovery grams | % Yield Based on SbCl$_3$ | % Yield Based on Sb$_2$S$_3$ | % S° Content |
|---|---|---|---|---|---|---|---|---|---|---|---|---|---|---|
| 20 | 22.8 | H$_2$/conc HCl | 26/9.8 | 25 | 175 | 141 | −2.5 to 8 | none | none | — | 41.0 | 110 | 80 | 2.0 |
| 21 | 11.4 | EtOH | 25 | 25 | 94 | 111 | −4 to 7 | 5 | none | — | 18.9 | 102 | 93 | 1.3 |
| 22 | 11.4 | H$_2$O/EtOH | 1.2/0.5 | 25 | 94 | 111 | −2 to 3 | 7 | none | — | 17.8 | 96 | 87 | 1.4 |
| 23 | 41.9 | EtOH | 46 | 26 | 289 | 120 | 2 to 6 | 7 | none | — | 68.4 | 108 | 83 | 1.7 |
| 24 | 22.8 | EtOH | 25 | 0 | 130 | 102 | 0–7 | 6 | 2 | 5 | 37.1 | 100 | 96 | 2.0 |

[1]This is the amount of Na$_3$SbS$_4$ solution required to produce the desired pH.
[2]It is assumed that the yield of Na$_3$SbS$_4$ in the first reaction is 100%. Since the second reaction is monitored by the pH reading, the values in this column have no significant meaning but were used as a rough guide while carrying out the second reaction.

Example 25

Effect of Addition Time of Sodium Thioantimonate Solution to Antimony Trihalide Solution on Free Sulfur Content in the Preparation of SbSbS$_4$:

An aqueous solution of 0.10M of sodium thioantimonate (Na$_3$SbS$_4$) was prepared using 2% excess of antimony trisulfide (Sb$_2$S$_3$) according to the procedure described for the preparation of sodium thioantimonate solution previously described. The sodium thioantimonate solution was divided equally into two parts which were then used to ascertain whether fast or slow addition of Na$_3$SbS$_4$ solution to alcoholic antimony trifluoride (SbF$_3$) solution in the preparation of SbSbS$_4$ has any effect on free sulfur content in the final products.

For the fast addition experiment, a sample of 8.59 g. (0.05M) of SbF$_3$ was dissolved in 17.5 ml. 200 proof ethanol in a 500 ml. flask which was immersed in a water bath at 17° C. and equipped with a reflux condenser, mechanical stirrer, addition funnel, N$_2$ inlet and outlet. One-half of the Na$_3$SbS$_4$ solution prepared above was added fairly rapidly at a relatively constant rate (33 minutes) to the alcoholic SbF$_3$ solution, with constant agitation. The pH of the reaction mixture was 6 throughout most of the addition period. A pH value of 8 was observed upon complete addition of the Na$_3$SbS$_4$ solution; however, it changed back to pH 6 after 30 minutes of agitation. The reaction mixture was allowed to agitate for one hour at about 18° C. and was filtered. The wet SbSbS$_4$ was washed repeatedly three times with hot distilled water (85° C.). The solid product was dried in a 100° C. oven overnight and weighed 32.0 g. (86.5% yield). The free sulfur content in the dry SbSbS$_4$ was found to be 2.22%.

For the slow addition experiment, the other half of the Na$_3$SbS$_4$ solution was reacted with 8.95 g. of SbF$_3$, dissolved in 17.5 ml. 200 proof ethanol under the same conditions as described above, with the exception of addition time. In the latter case, the addition time was 120 minutes instead of 33 minutes as in the fast addition experiment. The pH remained at 7 or less throughout the experiment. The overall yield was 86% and the free sulfur content in the dry SbSbS$_4$ product was found to be 0.53%. By keeping the other experimental parameters constant, if has been shown that maintenance of the pH at 7 or less by slow addition of Na$_3$SbS$_4$ solution to an alcoholic SbF$_3$ solution will result in lower free sulfur content in the final SbSbS$_4$ product.

We claim:

1. Method of preparing alkali metal or ammonium thioantimonate without the formation of substantial by-products, comprising:
(a) forming an aqueous reaction mixture of
   (i) sulfur,
   (ii) a sulfide or hydrosulfide of an alkali metal or ammonium ion, or mixtures of said sulfides or hydrosulfides, and
   (iii) a 1% to 10% molar excess of Sb$_2$S$_3$; and
(b) maintaining the reaction mixture of (a) at a temperature within the range of from about 70° C. to about 105° C. for a significant period of time to provide the alkali metal or ammonium thioantimonate without the formation of substantial by-products.

2. The method as in claim 1 wherein in (a) the molar excess of Sb$_2$S$_3$ is within the range of 1.5 to 5%.

3. The method as in claim 1 wherein in (b) the temperature is within the range of 75° C. to 100° C.

4. The method as in claim 1 wherein the sulfide or hydrosulfide is hydrated.

5. The method as in claim 1 wherein the alkali metal or ammonium thioantimonate of 1(b) is then added to a solution of SbX$_3$, wherein X is a halide ion, to form a reaction medium while maintaining controlled reaction conditions, to provide a SbSbS$_4$ product having a low level of free sulfur impurity.

6. The method as in claim 5 wherein the alkali metal or ammonium thioantimonate is added to the solution of SbX$_3$ at a sufficiently slow rate to maintain substantially all the SbSbS$_4$ product in a solid phase.

7. The method as in claim 6 wherein the SbX$_3$ solution includes as a solvent water or an alcohol of one to four carbon atoms or a mixture thereof.

8. The method as in claim 7 wherein X is Cl$^-$ and the alkali metal or ammonium thioantimonate is Na$_3$SbS$_4$.

9. The method as in claim 8 wherein the reaction medium is agitated during the addition of alkali metal or ammonium thioantimonate.

10. The method as in claim 5, 6, 7, 8 or 9 wherein the method is a batch method.

11. The method as in claim 5, 6, 7, 8, or 9 wherein the reaction temperature is maintained during the addition of alkali metal or ammonium thioantimonate within the range of 0° to 30° C.

12. The method as in claim 5, 6, 7, 8 or 9 wherein the pH of the reaction medium is maintained at substantially all times during the addition of alkali metal or ammonium thioantimonate at a level of 7 or less.

13. The method of claim 12 wherein the pH of 7 or less is maintained by controlling the rate of addition of the alkali metal or ammonium thioantimonate to the SbX$_3$ solution.

14. The method of claim 12 wherein the method is a batch method.

15. The method of claim 12 wherein the reaction temperature is maintained during the addition of alkali metal or ammonium thioantimonate within the range of 0° to 30° C.

16. Method of preparing $SbSbS_4$ product having a low level of free sulfur impurity, comprising: adding an alkali metal or ammonium thioantimonate intermediate to a solution of $SbX_3$, wherein X is a halide ion, to form a reaction medium while maintaining controlled reaction conditions in which the alkali metal or ammonium thioantimonate intermediate is added to the solution of $SbX_3$ at a sufficiently slow rate with agitation of the reaction medium to maintain substantially all the $SbSbS_4$ product in a solid phase, to provide a $SbSbS_4$ product having a low level of free sulfur impurity.

17. The method as in claim 16 wherein the $SbX_3$ solution includes as a solvent water or an alcohol of one to four carbon atoms or a mixture thereof.

18. The method as in claim 17 wherein X is $Cl^-$ or $F^-$.

19. The method as in claim 18 wherein the reaction medium is agitated during the addition of alkali metal or ammonium thioantimonate.

20. The method as in claim 16, 17, 18 or 19 wherein the method is a batch method.

21. The method as in claim 16, 17, 18 or 19 wherein the reaction temperature is maintained during the addition of alkali metal or ammonium thioantimonate within the range of 0° to 30° C.

22. The method as in claim 16, 17, 18 or 19 wherein the pH of the reaction medium is maintained at substantially all times at a level of 7 or less.

23. The method of claim 22 wherein the pH of 7 or less is maintained by controlling the rate of addition of the alkali metal or ammonium thioantimonate to the $SbX_3$ solution.

24. The method of claim 22 wherein the method is a batch method.

25. The method of claim 22 wherein the reaction temperature is maintained during the addition of alkali metal or ammonium thioantiomonate within the range of 0° to 30° C.

26. The method as in claim 16, 17, 18, or 19 wherein after the addition of the alkali metal or ammonium thioantimonate the reaction medium containing the $SbSbS_4$ product is heated to a temperature within the range of 80° C. to about 100° C. for a sufficient period of time to assure substantially complete reaction of the reactants in the reaction medium.

27. The method of claim 26 wherein the period of time is less than about two hours.

* * * * *